(12) United States Patent
Lockwood et al.

(10) Patent No.: US 6,998,734 B1
(45) Date of Patent: Feb. 14, 2006

(54) SYSTEMS AND METHODS FOR PROVIDING HIGH DENSITY CONNECTIONS FOR A NETWORK DEVICE

(75) Inventors: John Lockwood, Dublin, CA (US);
Mark Villegas, Pleasanton, CA (US);
Roger Han, Mountain View, CA (US);
Jianming Li, Cupertino, CA (US);
Antony P. Chatzigianis, San Carlos, CA (US); Johnny Chen, Danville, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 457 days.

(21) Appl. No.: 10/058,142

(22) Filed: Jan. 29, 2002

(51) Int. Cl.
*H01B 11/02* (2006.01)
(52) U.S. Cl. .................................. 307/147
(58) Field of Classification Search .............. 307/412; 439/676; 710/1; 333/1
See application file for complete search history.

(56) References Cited

U.S. PATENT DOCUMENTS

| | | | | |
|---|---|---|---|---|
| 4,305,630 A | * | 12/1981 | Mentlikowski et al. | 312/213 |
| 4,554,608 A | * | 11/1985 | Block | 361/119 |
| 5,661,631 A | * | 8/1997 | Crane, Jr. | 361/683 |
| 5,923,709 A | * | 7/1999 | Keel et al. | 375/257 |
| 6,057,743 A | * | 5/2000 | Aekins | 333/1 |
| 6,183,289 B1 | * | 2/2001 | Lake et al. | 439/449 |
| 6,304,934 B1 | * | 10/2001 | Pimenta et al. | 710/305 |
| 6,446,138 B1 | * | 9/2002 | Criscolo et al. | 710/1 |
| 2003/0096537 A1 | * | 5/2003 | Belopolsky | 439/676 |

* cited by examiner

*Primary Examiner*—Robert L. DeBeradinis
(74) *Attorney, Agent, or Firm*—Harrity Snyder, LLP (57) ABSTRACT

A signal conductor includes first and second connectors connected to the ends of a cable. The second connector includes a signal processing element that processes signals transmitted between the first and second connectors. In another implementation consistent with the principles of the invention, the signal processing element is located in a patch panel connected to the signal conductor.

38 Claims, 8 Drawing Sheets

SYSTEMS AND METHODS FOR PROVIDING HIGH DENSITY CONNECTIONS FOR A NETWORK DEVICE

BACKGROUND OF THE INVENTION

1. Field of the Invention

The present invention relates generally to data transfer and, more particularly, to systems and methods that provide high density connections for a network device.

2. Description of Related Art

Routers receive data on physical media, such as optical fiber, analyze the data to determine its destination, and output the data on physical media in accordance with the destination. Routers were initially designed using a general purpose processor executing large software programs. As line rates and traffic volume increased, however, general purpose processors could not scale to meet the new demands. For example, as new functions, such as accounting and policing functionality, were added to the software, these routers suffered performance degradation. In some instances, the routers failed to handle traffic at line rate when the new functionality was turned on.

To meet the new demands, purpose-built routers were designed. Purpose-built routers were designed and built with components optimized for routing. They not only handled higher line rates and higher network traffic volume, but they also added functionality without compromising line rate performance.

A conventional purpose-built router may include a number of port connections, such as Ethernet connections, to a local area network (LAN) or wide area network (WAN). The Ethernet connections typically occur via RJ45 connectors and category 5 unshielded twisted pair (CAT-5 UTP) cables for 10/100 Mb Ethernet connections between two end points.

Figure 1:
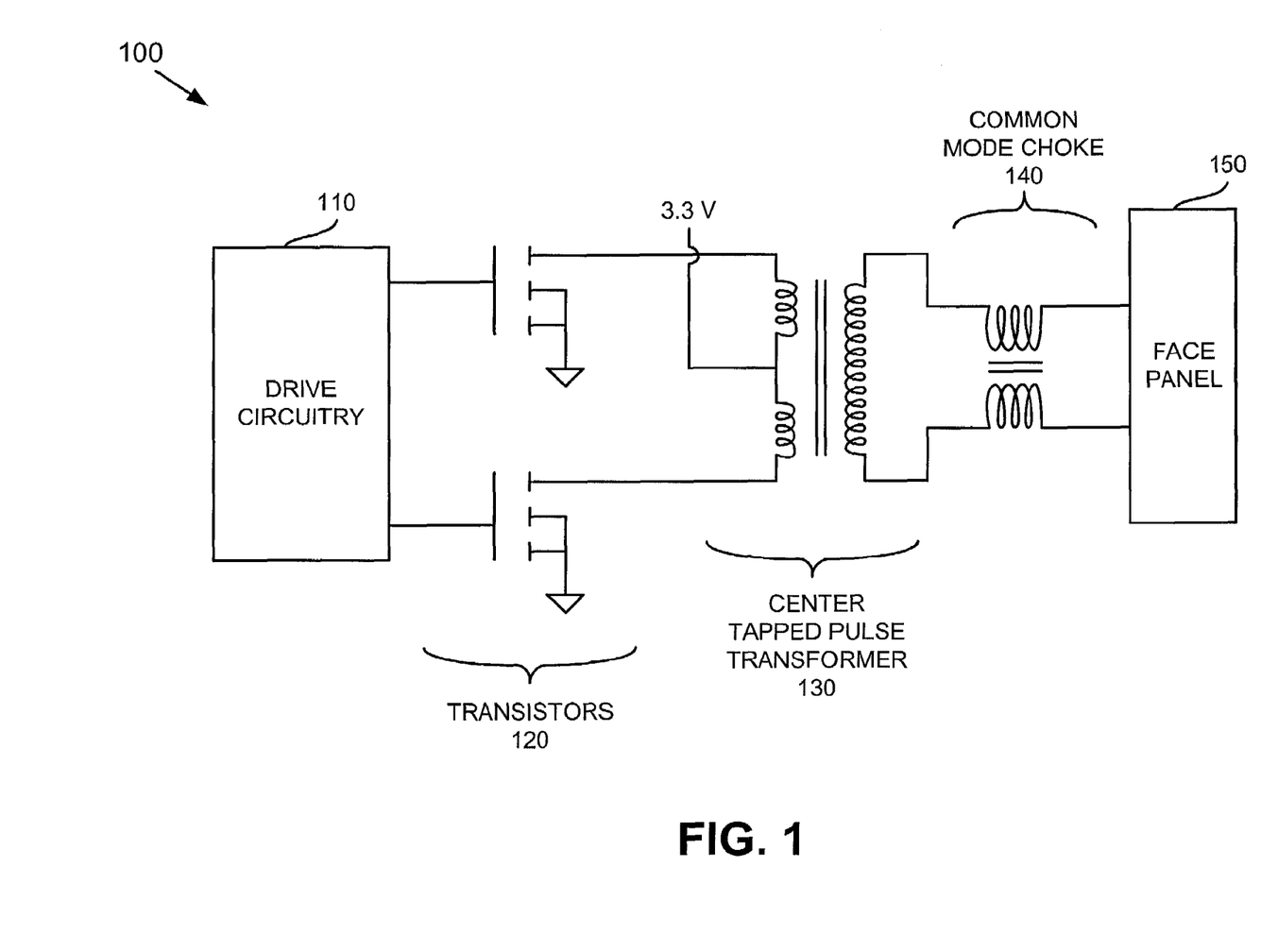
FIG. 1 is a block diagram of an input/output device for driving signals on an Ethernet connection.

FIG. 1 is a diagram of an input/output (I/O) device 100 for driving signals on an Ethernet connection. I/O device 100 includes drive circuitry 110, transistors 120, center tapped pulse transformer 130, common mode choke 140, and face panel 150. Drive circuitry 110 switches transistors 120 on and off for signals received from and transmitted to the Ethernet connection. Center tapped pulse transformer 130 performs signal processing functions, such as bias, balance, and transform functions. For example, center tapped pulse transformer 130 provides bias for transistors 120. Center tapped pulse transformer 130 also translates signals from single-ended signals relative to ground to balanced signals and provides filtering for electromagnetic compatibility.

Common mode choke 140 removes common mode noise from the signals so that the signals will not radiate. Face plate 150 includes RJ45 connectors. Face plate 150, however, has a limited amount of room for connectors. RJ45 connectors are fairly large. As a result, it is impossible to put more than 4–8 RJ45 connectors on face plate 150.

Therefore, there is a need in the art for mechanisms to expand the number of connectors available for port connections, such as Ethernet connections.

SUMMARY OF THE INVENTION

Systems and methods consistent with the principles of the invention address this and other needs by providing high density port connections for a network device. In some implementations consistent with the principles of the invention, an electrical cable includes mechanisms to permit additional port connections for the network device. In other implementations, a patch panel includes the mechanisms that permit the additional port connections.

According to one aspect of the present invention, a signal conductor includes first and second connectors connected to the ends of a cable. The second connector includes a signal processing element that processes signals transmitted between the first and second connectors.

In another implementation consistent with the principles of the invention, a network system includes a network device that communicates signals on a network and multiple signal conductors connected to the network device. Each of the signal conductors includes first and second connectors connected to the ends of a cable. The first or second connector includes a signal processing element that processes signals communicated with the network device.

In yet another implementation consistent with the principles of the invention, a patch panel includes multiple first connectors, multiple groups of second connectors, and multiple signal processing elements. At least one of the first connectors connects to a network device via a cable. Each of the groups of second connectors corresponds to one of the first connectors. Each of the signal processing elements processes signals transmitted between one of the first connectors and one of the groups of second connectors.

In a further implementation consistent with the principles of the invention, a network system includes a network device configured to communicate signals on a network and a patch panel configured to communicate signals with the network device via multiple cables. The patch panel includes pulse transformers configured to convert signals between balanced signals and single ended signals and common mode chokes corresponding to the pulse transformers and configured to remove common mode noise from the balanced signals.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with principles of the invention provide processing elements in a cable or patch panel to supply additional connection ports to a network device while minimizing the area needed on the face plate of the network device for connections with external cables. The cable or patch panel includes elements that, together with elements in the network device, perform signal processing functions, such as bias, balance, and transform functions.

EXEMPLARY SYSTEM CONFIGURATION

Figure 2:
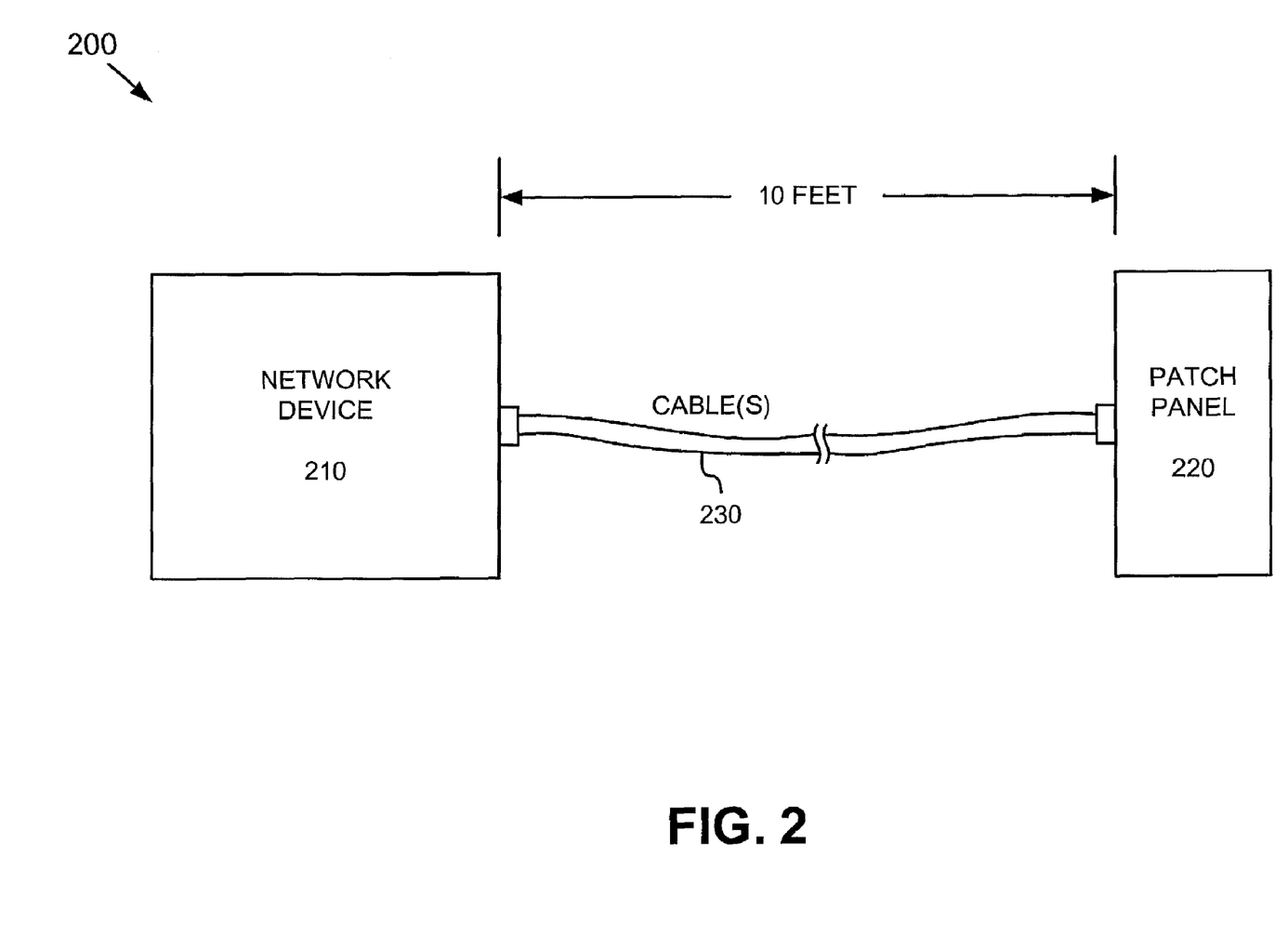
FIG. 2 is an exemplary diagram of a system in which systems and methods consistent with the principles of the invention may be implemented.

FIG. 2 is an exemplary diagram of a system 200 in which systems and methods consistent with the principles of the invention may be implemented. System 200 includes a network device 210 connected to a patch panel 220 via one or more cable(s) 230. In one implementation consistent with the principles of the invention, system 200 connects to patch panel 220 via four cables 230.

Network device 210 may include a routing system that performs functions for routing packets in a network. Network device 210 may transmit and receive packet information on cable(s) 230. Cable(s) 230 may transmit packet information between network device 210 and patch panel 220 over a distance of up to approximately 10 feet. Of course, other lengths of cable(s) 230 are possible. Patch panel 220 may permit network device 210 to connect to systems and devices, such as other network devices, for the transmission and reception of packet information.

Network Device

Figure 3:
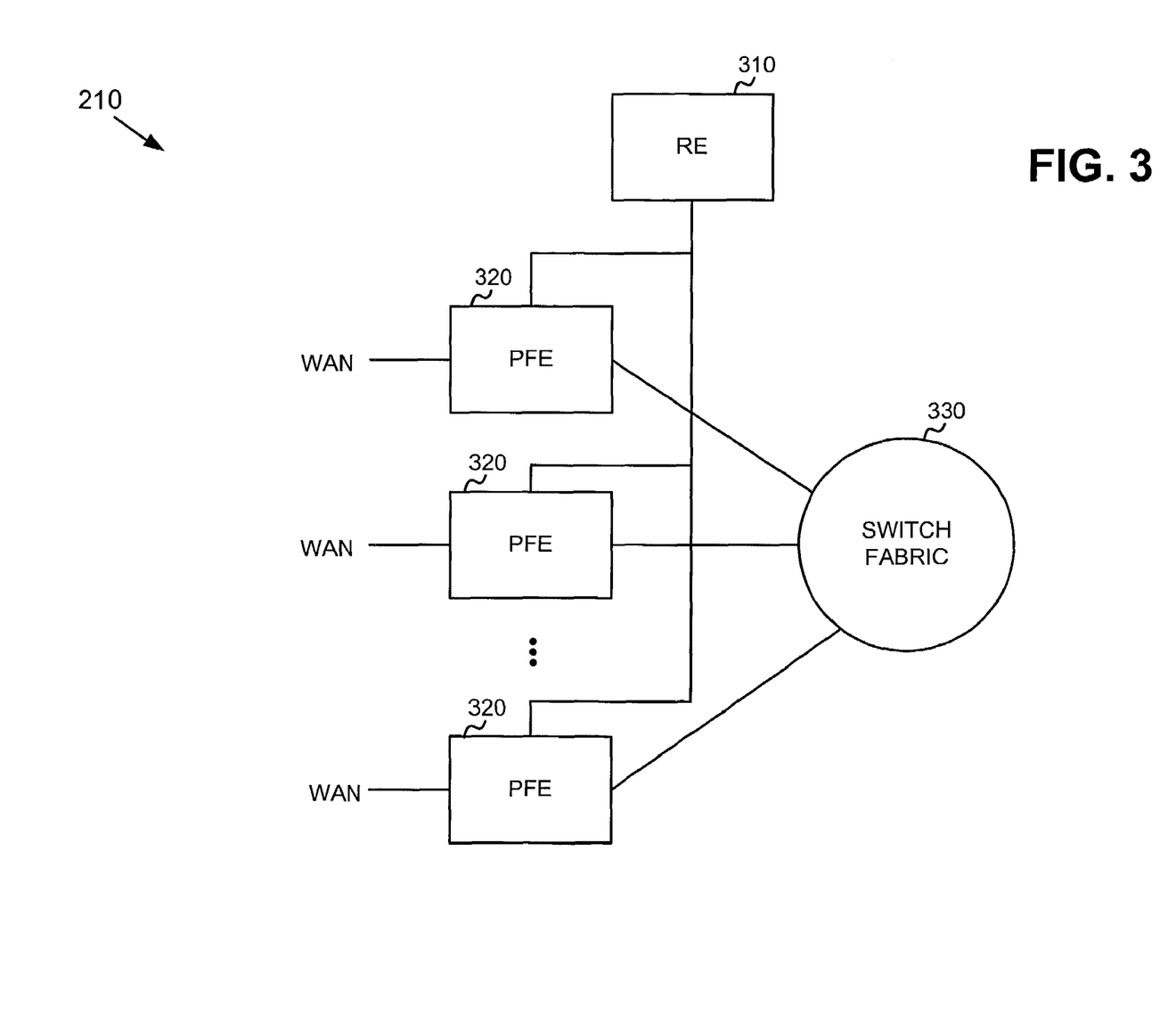
FIG. 3 is an exemplary block diagram of the network device of FIG. 2 according to an implementation consistent with the principles of the invention.

FIG. 3 is a block diagram illustrating an exemplary network device 210 consistent with the principles of the invention. Network device 210 may receive one or more packet streams from a physical link, process the stream(s) to determine destination information, and transmit the stream(s) on one or more links in accordance with the destination information.

Network device 210 may include a routing engine (RE) 310 and multiple packet forwarding engines (PFEs) 320 interconnected via a switch fabric 330. Switch fabric 330 may include one or more switching planes to facilitate communication between two or more of PFEs 320. In an implementation consistent with the principles of the invention, each of the switching planes includes a three-stage switch of crossbar elements.

RE 310 performs high level management functions for network device 210. For example, RE 310 communicates with other networks and systems connected to network device 210 to exchange information regarding network topology. RE 310 creates routing tables based on network topology information, creates forwarding tables based on the routing tables, and sends the forwarding tables to PFEs 320. PFEs 320 use the forwarding tables to perform route lookup for incoming packets. RE 310 also performs other general control and monitoring functions for network device 210.

Each of PFEs 320 connects to RE 310 and switch fabric 330. PFEs 320 receive packets on physical links connected to a network, such as a wide area network (WAN). Each physical link could be one of many types of transport media, such as optical fiber or Ethernet cable. The packets on the physical link are formatted according to one of several protocols, such as the synchronous optical network (SONET) standard or Ethernet.

Figure 4:
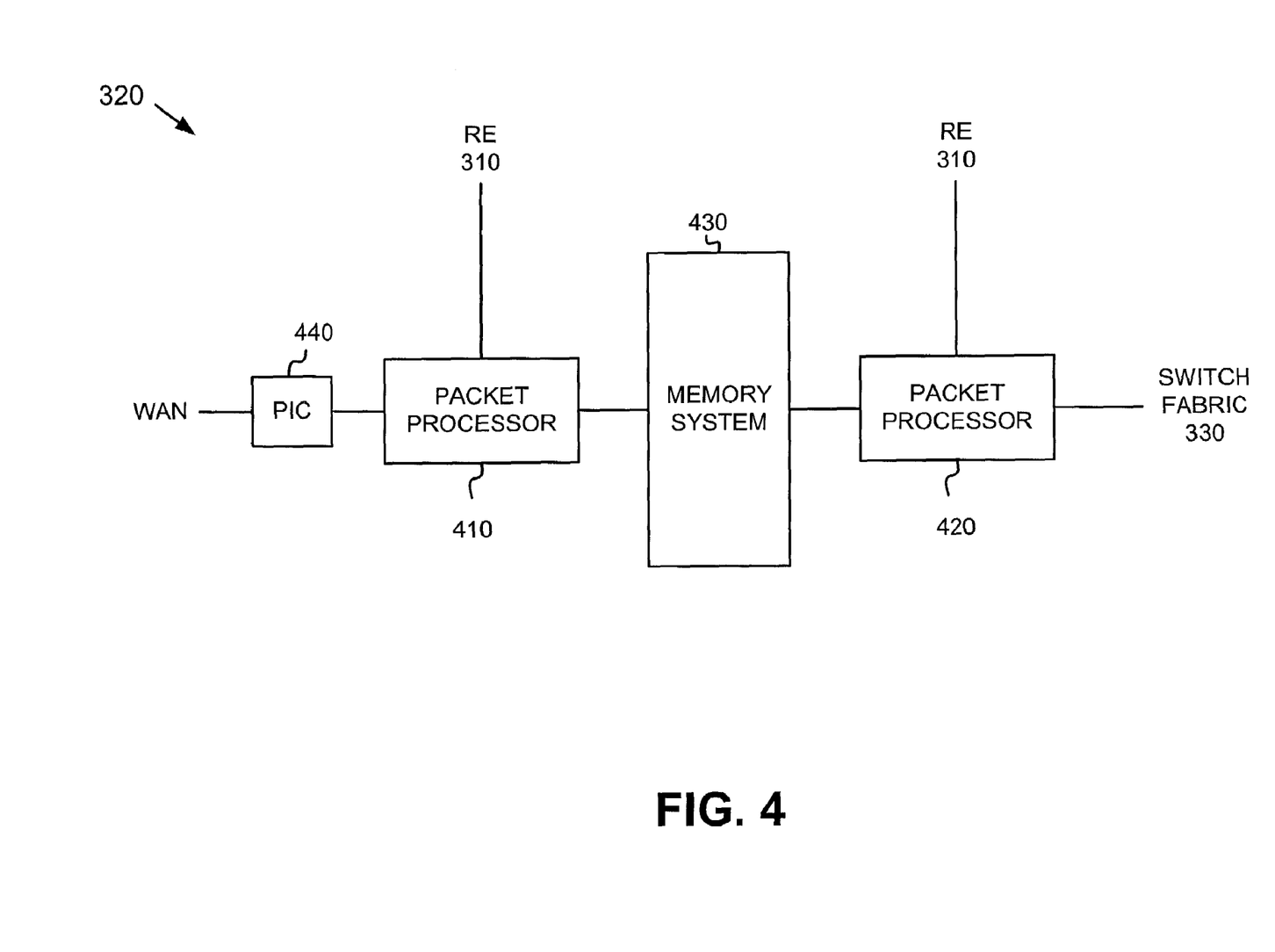
FIG. 4 is an exemplary diagram of a PFE of FIG. 3 according to an implementation consistent with the principles of the invention.

FIG. 4 is an exemplary diagram of a PFE 320 according to an implementation consistent with the principles of the invention. PFE 320 may include two packet processors 410 and 420 connected to a memory system 430 and RE 310. Packet processor 410 connects to WAN physical links via one or more physical interface cards (PICs) 440. Packet processor 410 may process packets received from the WAN links and prepare packets for transmission on the WAN links. For example, packet processor 410 may perform route lookup based on packet header information to determine destination information for the packets. For packets received from the WAN, packet processor 410 may store data in memory system 430. For packets to be transmitted on the WAN, packet processor 410 may read data from memory system 430.

Packet processor 420 connects to switch fabric 330. Packet processor 420 may process packets received from switch fabric 330 and prepare packets for transmission to switch fabric 330. For packets received from switch fabric 330, packet processor 420 may store data in memory system 430. For packets to be transmitted to switch fabric 330, packet processor 420 may read data from memory system 430.

Memory system 430 may include one or more memory banks for storing data and other packet information, such as control and/or address information, from packet processors 410 and 420. For example, memory system 430 may include a data memory and a packet information memory. The data memory may store data from a packet possibly in non-contiguous locations. The packet information memory may store the corresponding packet information in queues based on, for example, the packet stream to which the packet information corresponds.

PIC(s) 440 may transmit data between a WAN physical link and packet processor 410. PIC(s) 440 may initially process data received from the WAN and data to be transmitted on the WAN. Different PICs may be designed to handle different types of WAN physical links. For example, one PIC may be an interface for an optical link while another PIC may be an interface for an Ethernet link.

Figure 5:
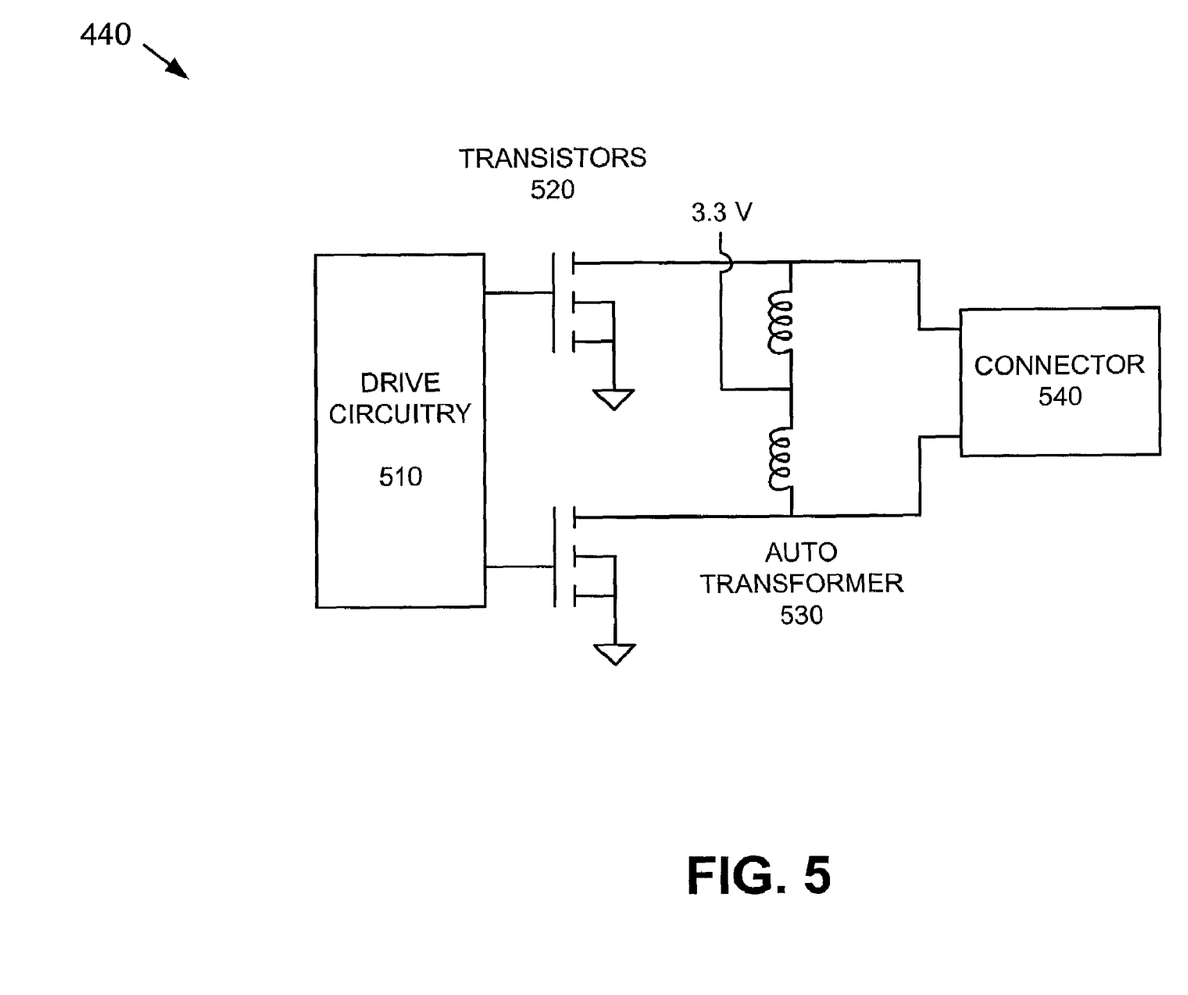
FIG. 5 is an exemplary diagram of a portion of a PIC of FIG. 4 according to an implementation consistent with the principles of the invention.

FIG. 5 is an exemplary diagram of a portion of a PIC 440 consistent with the principles of the invention. PIC 440 includes drive circuitry 510, transistors 520, auto transformer 530, and connector 540. Drive circuitry 510 switches transistors 520 on and off for signals received from the WAN and signals to be transmitted to the WAN. Transistors 520 may include a pair of field-effect transistors. Auto transformer 530 may include bias circuitry that generates bias signals for transistors 520. Connector 540 provides an interface between PIC 440 and a cable 230 (FIG. 2).

Cable

Figure 6:
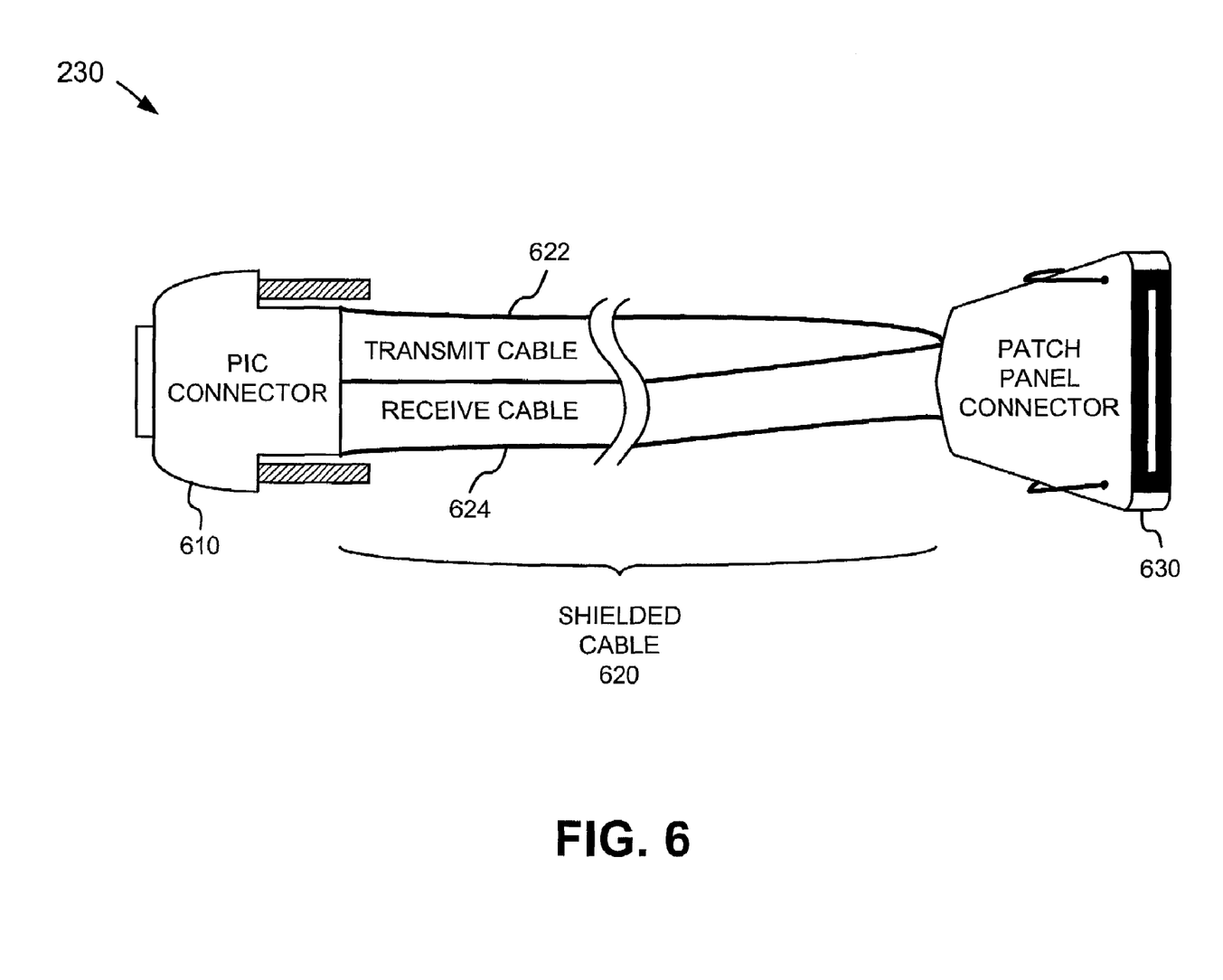
FIG. 6 is an exemplary diagram of a cable of FIG. 2 according to an implementation consistent with the principles of the invention.

FIG. 6 is an exemplary diagram of a cable 230 according to an implementation consistent with the principles of the invention. Cable 230 may be capable of handling 12 connection ports (e.g., Ethernet ports). Cable 230 is a shielded cable that may be construed as extending part of the chassis of network device 210 (FIG. 2) to the end of cable 230.

Cable 230 includes PIC connector 610, shielded cable 620, and patch panel connector 630. PIC connector 610 may include a 60 pin very high density cable interconnect (VHDCI) that connects to a connector of PIC 440 (FIG. 4). Shielded cable 620 may include a twisted pair cable with a 100 ohm impedance. Shielded cable 620 may include transmit cable 622 and receive cable 624. The transmission and reception of signals may be separated on transmit cable 622 and receive cable 624, respectively, to avoid cross talk.

Patch panel connector 630 may include a 50 pin telephone company (TELCO) connector that connects to a connector of patch panel 220 (FIG. 2). Patch panel connector 630 may include signal processing elements associated with the transmit and receive cables 622 and 624. For example, transmit cable 622 may route to a signal processing element on one side of patch panel connector 630 and receive cable 624 may route to a signal processing element on the other side of patch panel connector 630.

Figure 7:
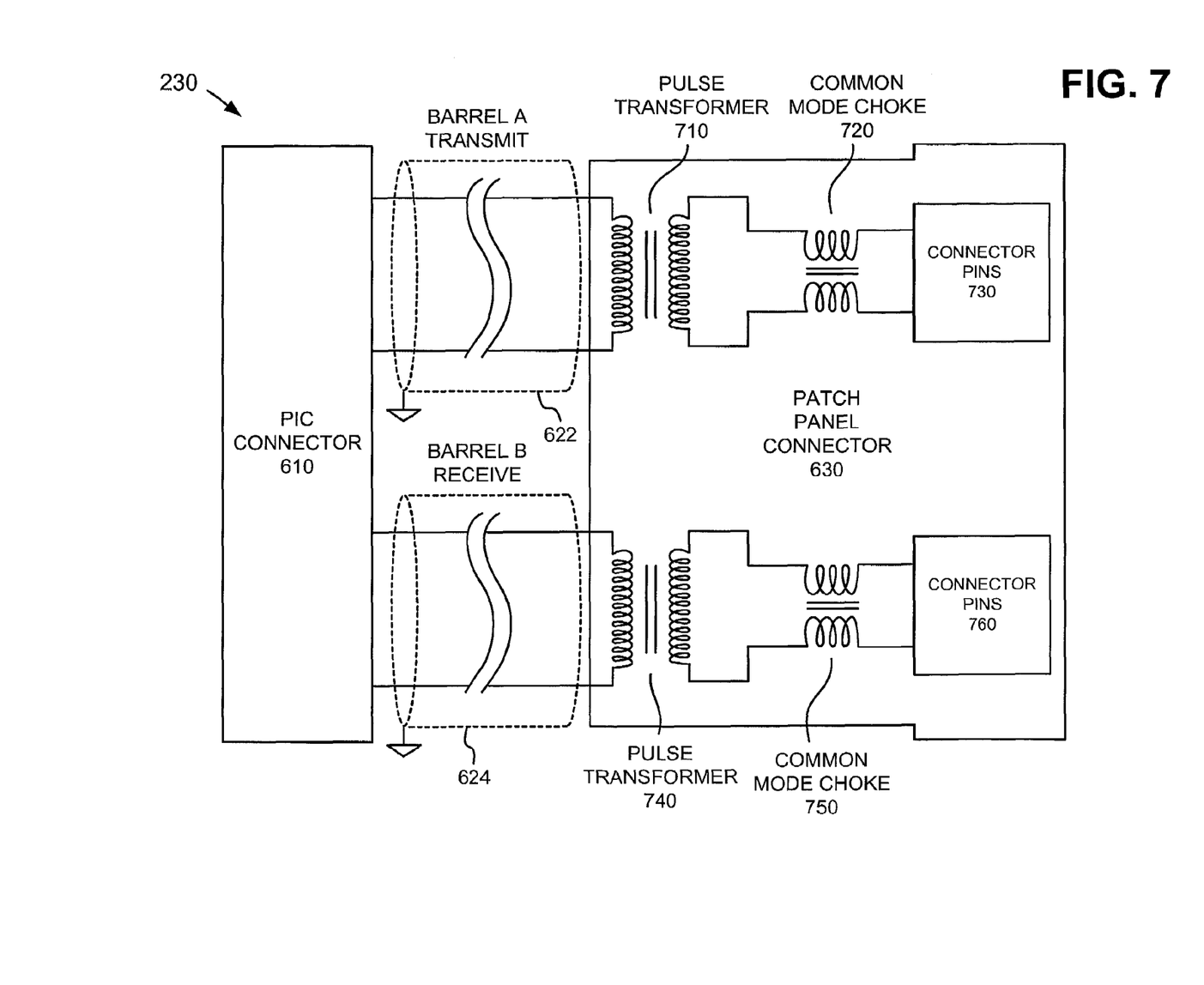
FIG. 7 is a detailed diagram of the patch panel connector of FIG. 6 according to an implementation consistent with the principles of the invention.

FIG. 7 is a detailed diagram of patch panel connector 630 according to an implementation consistent with the principles of the invention. Patch panel connector 630 includes transmit signal processing elements, such as pulse transformer 710, common mode choke 720, and connector pins 730, corresponding to transmit cable 622. Additionally, patch panel connector 630 includes receive signal processing elements, such as pulse transformer 740, common mode choke 750, and connector pins 760, corresponding to receive cable 624.

Pulse transformer 710 receives signals from PIC 440 and translates the signals from single ended signals relative to ground to balanced signals. Common mode choke 720 removes common mode noise from the balanced signals. Connector pins 730 connect to pins of a connector belonging to patch panel 220 to transmit the signals from common mode choke 720.

Connector pins 760 connect to pins of a connector belonging to patch panel 220 to receive balanced signals from patch panel 220. Common mode choke 750 removes common mode noise from the balanced signals. Pulse transformer 740 converts the signals from balanced signals to single ended signals relative to ground and transmits the signals to PIC 440.

Patch Panel

Figure 8A:
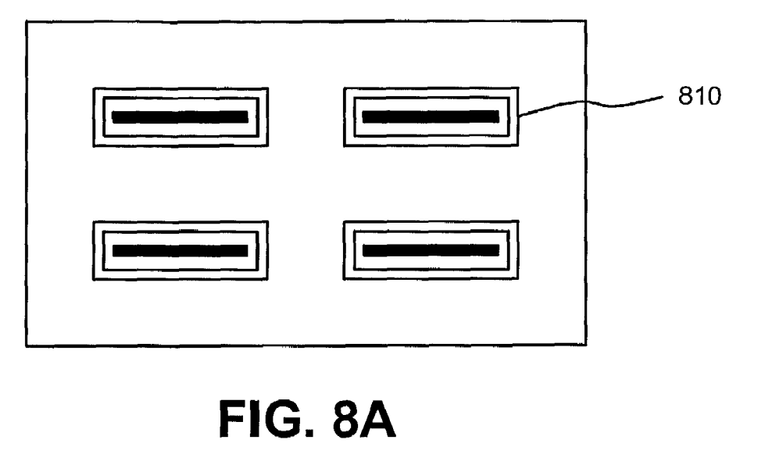
FIGS. 8A and 8B are exemplary diagrams of back and front views, respectively, of the patch panel of FIG. 2 according to an implementation consistent with the principles of the invention.
Figure 8B:
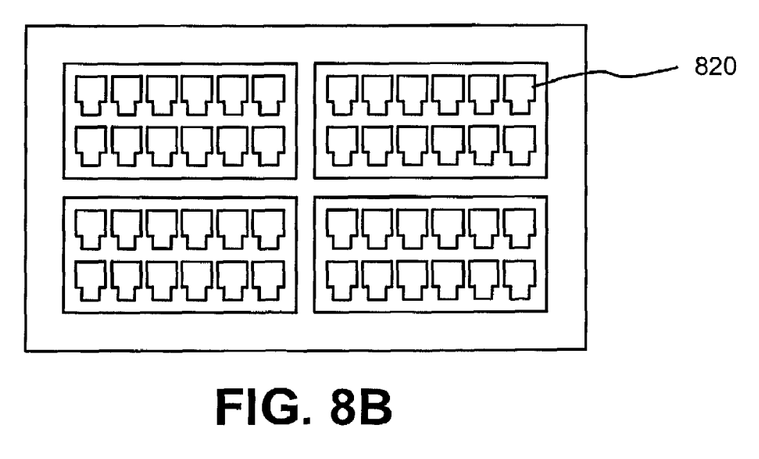

FIGS. 8A and 8B are exemplary diagrams of back and front views, respectively, of patch panel 220 (FIG. 2) according to an implementation consistent with the principles of the invention. The back of patch panel 220 includes multiple connectors 810 for interfacing with patch panel connectors 630 (FIG. 6) of cables 230.

The front of patch panel 220 includes multiple connectors 820, such as RJ21 or RJ45 connectors, for category 5 (CAT-5) cables. In the implementation illustrated in FIG. 8B, there are 12 connectors 820 corresponding to each connector 810. Connectors 820 provide additional connection ports for network device 210.

Patch panel 220 connects pins of connectors 810 to pins of connectors 820 so that signals may be transmitted between them.

Exemplary System Configuration with Passive Cable

In the implementations described thus far, cable(s) 230 (FIG. 2) have been described as containing one or more signal processing elements for processing signals communicated with network device 210. In alternate implementations consistent with the principles of the invention, the signal processing element(s) are located in patch panel 220.

In these alternate implementations, cable(s) 230 simply include wires and connectors. In this case, however, the shielding from network device 210 extends all the way to inside patch panel 220. To achieve this, patch panel connector 630 (FIG. 6) may be constructed of a conductive material, such as metal.

Patch panel 220, in this case, contains signal processing elements, such as pulse transformers 710 and 740 and common mode chokes 720 and 750.

CONCLUSION

By moving some signal processing elements to a cable or patch panel, systems and methods consistent with the principles of the invention provide additional connection ports to a network device while minimizing the area needed on the face plate of the network device for connections with external cables. Although described in the context of a routing system, concepts consistent with the principles of the invention can be implemented in any system that processes and buffers data.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, patch panel connector 630 (FIG. 6) has been described as containing one or more signal processing elements to process signals transmitted between network device 210 and patch panel 220. In another implementation consistent with the principles of the invention, PIC connector 610 contains these signal processing elements.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A cable, comprising:
   a first connector;
   a second connector comprising:
      a signal processing element configured to process signals transmitted between the first and second connectors, the signal processing element comprises:
         a first pulse transformer configured to translate signals transmitted from the first connector to the second connector from first single ended signals to first balanced signals,
         a first common mode choke configured to remove common mode noise from the first balanced signals,
         a second pulse transformer configured to translate signals transmitted from the second connector to the first connector from second balanced signals to second single ended signals, and
         a second common mode choke configured to remove common mode noise from the second balanced signals,
      where the first pulse transformer and the first common mode choke are located on a first side of the second connector and the second pulse transformer and the second common mode choke are located on a second side of the second connector; and
   a cable conductor connected at a first end to the first connector and at a second end to the second connector, where the cable conductor comprises:
      a transmit cable configured to transmit the signals from the first connector to the second connector, and
      a receive cable configured to transmit the signals from the second connector to the first connector.

2. The cable of claim 1, wherein the first connector connects to a network device and the second connector connects to a patch panel.

3. The cable of claim 1, wherein the first connector connects to a patch panel and the second connector connects to a network device.

4. The cable of claim 1, wherein the cable conductor includes a shielded cable.

5. The cable of claim 1, wherein the first connector includes a very high density cable interconnect.

6. The cable of claim 1, wherein the second connector includes a telephone company connector.

7. The cable of claim 1, wherein the cable conductor has a length of approximately 10 feet.

8. A network system, comprising:
a network device configured to communicate signals on a network; and
a plurality of cables connected to the network device, each of the cables comprising:
a first connector connected to the network device,
a second connector comprising:
a signal processing element configured to process signals communicated with the network device, where the signal processing element comprises:
a first pulse transformer configured to translate signals transmitted from the first connector to the second connector from first single ended signals to first balanced signals,
a first common mode choke configured to remove common mode noise from the first balanced signals
a second pulse transformer configured to translate signals transmitted from the second connector to the first connector from second balanced signals to second single ended signals,
a second common mode choke configured to remove common mode noise from the second balanced signals, and
a cable conductor connected at a first end to the first connector and a second end to the second connector, the cable conductor being configured to extend shielding from the network device to the second connector, where the cable conductor comprises:
a transmit cable configured to transmit the signals from the first connector to the second connector, and
a receive cable configured to transmit the signals from the second connector to the first connector.

9. The network system of claim 8, wherein the network device is a router.

10. The network system of claim 8, wherein the second connector is configured to connect to a patch panel.

11. The network system of claim 8, wherein the first pulse transformer and the first common mode choke are located on a first side of the second connector and the second pulse transformer and the second common mode choke are located on a second side of the second connector.

12. The network system of claim 8, wherein the cable conductor includes a shielded cable.

13. The network system of claim 8, wherein the first connector includes a very high density cable interconnect.

14. The network system of claim 8, wherein the second connector includes a telephone company connector.

15. A network system, comprising:
a network device configured to communicate signals on a network; and
a plurality of cables connected to the network device, each of the cables comprising:
a first connector connected to the network device, the first connector comprising:
first and second signal processing elements configured to process signals communicated with the network device, where the first signal processing element is located on a first side of the first connector and the second signal processing element is located on a second side of the first connector,
a second connector, and
a cable conductor connected at a first end to the first connector and at a second end to the second connector, where the cable conductor comprises:
a transmit cable configured to transmit signals from the first connector to the second connector and
a receive cable configured to transmit signals from the second connector to the first connector.

16. The network system of claim 15, wherein the second connector is configured to connect to a patch panel.

17. The network system of claim 15, wherein the first signal processing element includes:
a first pulse transformer configured to translate signals received from the transmit cable from first single ended signals to first balanced signals, and
where the second signal processing element includes:
a second pulse transformer configured to translate signals from second balanced signals to second single ended signals for transmission to the receive cable.

18. The network system of claim 17, wherein the first signal processing element further includes:
a first common mode choke configured to remove common mode noise from the first balanced signals, and
where the second signal processing element includes:
a second common mode choke configured to remove common mode noise from the second balanced signals.

19. The network system of claim 15, wherein the cable conductor includes a shielded cable.

20. A patch panel, comprising:
a plurality of first connectors, at least one of the first connectors being configured to connect to a network device via a cable;
a plurality of groups of second connectors, each of the groups of second connectors corresponding to one of the first connectors; and
a plurality of signal processing elements, each of the signal processing elements being configured to process signals transmitted between one of the first connectors and one of the groups of second connectors.

21. The patch panel of claim 20, wherein each of the signal processing elements includes:
a pulse transformer configured to translate the signals communicated between the one first connector and the one group of second connectors between balanced signals and single ended signals.

22. The patch panel of claim 21, wherein each of the signal processing elements further includes:
a common mode choke configured to remove common mode noise from the balanced signals.

23. The patch panel of claim 20, wherein the cable includes a shielded cable that extends shielding from the network device to the plurality of signal processing elements.

24. The patch panel of claim 20, wherein the cable includes transmit and receive cables, the transmit cable transmitting signals from the network device to the patch panel and the receive cable transmitting signals from the patch panel to the network device.

25. The patch panel of claim 24, wherein each of the signal processing elements includes:
- a first pulse transformer configured to convert signals received from the transmit cable from first single ended signals to first balanced signals, and
- a second pulse transformer configured to convert signals from second balanced signals to second single ended signals for transmission to the receive cable.

26. The patch panel of claim 25, wherein each of the signal processing elements further includes:
- a first common mode choke configured to remove common mode noise from the first balanced signals, and
- a second common mode choke configured to remove common mode noise from the second balanced signals.

27. The patch panel of claim 20, wherein the first connectors are located on a first side of the patch panel and the groups of second connectors are located on a second side of the patch panel.

28. A network system, comprising:
- a network device configured to communicate signals on a network; and
- a patch panel configured to communicate signals with the network device via a plurality of cables, the patch panel comprising:
  - a plurality of pulse transformers configured to convert signals between balanced signals and single ended signals, and
  - a plurality of common mode chokes corresponding to the pulse transformers and configured to remove common mode noise from the balanced signals.

29. The network system of claim 28, wherein the network device includes a router.

30. The network system of claim 28, wherein each of the cables includes a shielded cable that extends shielding from the network device into the patch panel.

31. The network system of claim 28, wherein each of the cables includes transmit and receive cables, the transmit cable transmitting signals from the network device to the patch panel and the receive cable transmitting signals from the patch panel to the network device.

32. The network system of claim 31, wherein the plurality of pulse transformers include:
- a plurality of first pulse transformers configured to translate signals received from the transmit cables from first single ended signals to first balanced signals, and
- a plurality of second pulse transformers configured to translate signals from second balanced signals to second single ended signals for transmission to the receive cables.

33. The network system of claim 32, wherein the plurality of common mode chokes include:
- a plurality of first common mode chokes corresponding to the first pulse transformers and configured to remove common mode noise from the first balanced signals, and
- a plurality of second common mode chokes corresponding to the second pulse transformers and configured to remove common mode noise from the second balanced signals.

34. The network system of claim 28, wherein the patch panel comprises:
- a plurality of first connectors to connect to the cables, and
- a plurality of groups of second connectors, each of the groups of second connectors corresponding to one of the first connectors.

35. The network system of claim 34, wherein the plurality of pulse transformers and the plurality of common mode chokes are located between the first connectors and the groups of second connectors.

36. A cable, comprising:
- a first connector;
- a second connector comprising:
  - first means for processing signals transmitted from the first connector to the second connector, the first means being located on a first side of the second connector, and
  - second means for processing signals transmitted from the second connector to the first connector, the second means being located on a second side of the second connector, the second side being opposite the first side,
  - where each of the first means and the second means includes:
    - means for translating the signals between balanced signals and single ended signals, and
    - means for removing common mode noise from the balanced signals; and
- a cable conductor connected at a first end to the first connector and at a second end to the second connector, the cable conductor comprising:
  - means for extending shielding from the first connector to the second connector.

37. A patch panel comprising:
- means for providing a plurality of first connectors configured to connect to a network device via one or more cables;
- means for providing a plurality of groups of second connectors, each of the groups of second connectors corresponding to one of the first connectors; and
- means for processing signals transmitted between each of the first connectors and a corresponding one of the groups of second connectors.

38. The patch panel of claim 37, wherein the means for processing includes:
- means for translating the signals between balanced signals and single ended signals, and
- means for removing common mode noise from the balanced signals.

* * * * *